United States Patent [19]

Muskulus

[11] Patent Number: 4,563,962
[45] Date of Patent: Jan. 14, 1986

[54] BOUND-STATORS OR ROTORS FOR ELECTRICAL MACHINES

[76] Inventor: Willi Muskulus, An der Pfaffenmauer 17, 6000 Frankfurt/Main 60, Fed. Rep. of Germany

[21] Appl. No.: 381,754

[22] Filed: May 25, 1982

[30] Foreign Application Priority Data

Jun. 3, 1981 [DE] Fed. Rep. of Germany ....... 3121934

[51] Int. Cl.⁴ .................. D05B 3/00; D05B 23/00; H01F 41/02
[52] U.S. Cl. .................. 112/262.1; 112/121.2
[58] Field of Search ............... 112/262.1, 262.2, 121.2, 112/2

[56] References Cited

U.S. PATENT DOCUMENTS

| | | | |
|---|---|---|---|
| 2,883,949 | 4/1959 | Ammann | 112/121.2 |
| 3,050,019 | 8/1962 | Muskulus | 42/121.2 |
| 3,685,470 | 8/1972 | Frederick | 112/121.2 |
| 3,844,235 | 10/1974 | Habegger | 112/121.2 |
| 3,983,826 | 10/1976 | Dunn | 112/121.2 X |

Primary Examiner—H. Hampton Hunter
Attorney, Agent, or Firm—Larson and Taylor

[57] ABSTRACT

A stator or rotor for electrical machines is described whose winding overhangs are in each case bound with a single thread at one end, the intertwinings of all the loops formed from the thread being situated at the radially internal side of the winding overhangs. In the method proposed for producing such a stator or rotor, thread loops are drawn from radially outside alternately through below the winding overhangs and over the winding overhangs, and then intertwined at the radially internal sides of these, in that through each loop there is drawn the loop formed next. An apparatus suitable for carrying out this method has a needle with an eye at the forward end, which is taken alternately under and over the winding overhangs in the radial direction into the working region of a hook which is adapted to be moved rectilinearly and axially at the radially internal side of the winding overhangs.

6 Claims, 12 Drawing Figures

BOUND-STATORS OR ROTORS FOR ELECTRICAL MACHINES

The invention relates to a stator or rotor for electrical machines, said stator or rotor comprising bound winding ends or overhangs.

Reference can be made to binding winding overhangs as disclosed in German Pat. No. 1203873.

It is known (German published specification No. 1 201 908) to bind winding overhangs by intertwining thread loops formed from two different threads one of which is taken from a mobile shuttle. Simpler, however, are tying or binding apparatus and methods which work with a single thread, because that enables the shuttle to be dispensed with. In that respect, binding tools need only comprise two mobile parts, namely a needle element for introducing thread and a hook element for drawing thread loops. Various such apparatus and methods are known which differ as regards arrangement and pattern of movements of the needle and hook elements, but those apparatus and methods result in bindings wherein intertwinings of loops formed from the single continuous thread with the respective loops which follow are situated at the radially external side of winding overhangs. This has the result that the binding is substantially more stable at the radially external side of the winding overhangs than at the internal side thereof, although the dangers to the wires of the winding overhangs are above all from radially internal parts rotating relatively to them.

In some known apparatus and methods, there can be disadvantages in that the hook has to pass through below winding overhangs; because when the hook is withdrawn, wires may also be engaged and damaged (cf. for example German Pat. No. 1051375, German published specification No. 2015135, German laid-open specification No. 2637909). For that reason, in such binding apparatus, a pre-piercing needle often has to be used in an additional operation to provide space at the place where the hook is to be passed through below winding overhangs. A further uncertainty is added in known apparatus when additional noses are provided on the hook; and mobile stripper elements have to be provided for holding thread loops during some phases, because this state of affairs constitutes a source of possible malfunctioning owing to irregularities which occur when winding overhangs.

The risk of wire damage and malfunctions of binding tools is substantially smaller if as in German Pat. No. 1203873 and U.S. Pat. No. 2,883,949, thread loops are taken through below winding overhangs by a needle having an eye. In known binding apparatus of that kind, a hook then brings these loops from the inside of the winding overhangs about the latter and back outwardly below approximately to the starting point of loop formation, so that the needle can draw through the next loop. In such cases, the hook has to carry out a relatively complicated movement, and also over the last portion of its travel outwardly from the inside has to push the thread loop oppositely to the hook direction, which involves uncertainties despite special formation of the hook's head. Also, with that binding technique, all thread loops have only a single intertwining below, at the radially external side of winding overhangs, so that the loops readily shift and loosen in the event of irregular winding overhangs.

An object of the present invention is to provide a binding formed from a single thread, which binding protects winding overhangs against damage better than hitherto. Some further objects are to provide a production method resulting in very secure binding, and a binding apparatus suitable for said method and allowing said method to be carried out in a reliably operating manner with constructionally simple means.

A first aspect of the present invention provides a stator or rotor for electrical machine(s), said stator or rotor comprising winding overhangs bound at least at one end thereof by intertwined thread loops of a single thread, wherein intertwinings of thread loops are at the radially internal side of winding overhangs.

A second aspect of the present invention provides a method of producing a stator or rotor according to said first aspect, wherein, from a thread drawn from a thread supply, loops are formed in succession to one another and in progression about the periphery of the stator or rotor, and loops are drawn through respective loops formed previously from the same thread; and wherein all loops are drawn only inwardly from the outside in the radial direction, and (at the radially internal side of the winding overhangs) are drawn through respective loops previously formed.

A third aspect of the present invention provides apparatus for carrying out the method of said second aspect, comprising:

a stator or rotor holder for holding a stator or rotor; and a binding tool mobile stepwise about the circumference thereof, comprising: (a) a needle adapted to move to and fro relatively to the stator or rotor from the outside in the radial sense through below winding overhangs, said needle having an eye at the front end through which is guidable a thread drawable from a thread supply; and (b) a rotatable and axially movable hook which at the radially internal side of winding overhangs will engage thread loops formed by said needle and draw them axially so as to intertwine them with another loop formed from the same thread;

wherein said needle is adapted to move at each second advance and withdrawal stroke in the radial direction from the outside over winding overhangs, and said hook is adapted (in addition to turning movement) to carry out only a substantially rectilinear to and fro axial movement, said hook being able to advance with its shank through a thread loop formed by said needle, said hook being able to advance with the nose of said hook to beyond the engaging position adjacent the next thread loop formed by said needle, and draw this loop at the return stroke through a thread loop held on said shank.

Further disclosure of the present invention is constituted by the following description and claims appended hereto.

A stator or rotor bound according to the present invention is characterised in that all the intertwinings of thread loops are situated at the radially internal side of winding overhangs. In this way, the thread is secured in the best way against displacement at the internal side of winding overhangs, i.e. precisely at the region where the risk of damage to wires is greatest.

Security of binding can be further improved by suitable choice of thread movement pattern, e.g. "crochet pattern". In one preference, thread loops are directed with their closed ends alternately in opposite axial directions, and at each thread loop the intertwining with the respective previously formed loop is spaced from the intertwining with the respective loop formed thereafter.

In the method of said second aspect of the invention all the loops can be drawn only inward from the outside in the radial direction, and (at the radially internal side of the winding overhangs) be drawn through respective loops previously formed. To achieve encircling of winding overhangs, the loops have to be drawn alternately through below winding overhangs and axially to above winding overhangs. For intertwining the thread loops at the internal side of winding overhangs, there are then two possibilities: either the loops drawn through below winding overhangs are drawn axially outwardly for intertwining with loops drawn past to above winding overhangs; or loops drawn to above winding overhangs are drawn axially inwardly for intertwining with loops drawn through below the winding overhangs. The first alternative has the advantage that the binding apparatus for it can be simpler. The second alternative offers the advantage that intertwinings of the thread loops are sited axially further inside on the winding overhangs.

The method of said second aspect of the invention makes it possible to lay the thread end in the same direction on or directly adjacent the thread start at the end of the binding operation, from which then follows the advantageous possibility of connecting automatically together the thread start and the thread end. Preferably, this is effected by clamping thread start and thread end to one another, or (if the thread is made of synthetic plastic material) welding them together.

In apparatus of said third aspect of the invention, said needle is movable at every second forward and return stroke from the outside in the radial direction over winding overhangs; and the hook (in addition to its turning movement) carries out only a substantially rectilinear to and fro axial movement, wherein it advances with its shank through a thread loop formed by the needle and advances with said nose into the engaging position adjacent the next thread loop formed by the needle, and draws this loop at the return stroke through a thread loop held on said shank. In this way, the motion drives for needle and hook are very simple. Also, there is optimum operating reliability when engaging thread and intertwining thread loops by means of the hook.

The present invention will now be described by way of example with reference to the accompanying drawings, wherein reference is made to a stator. The stator could insted be a rotor. In the drawings.

Figure 1:
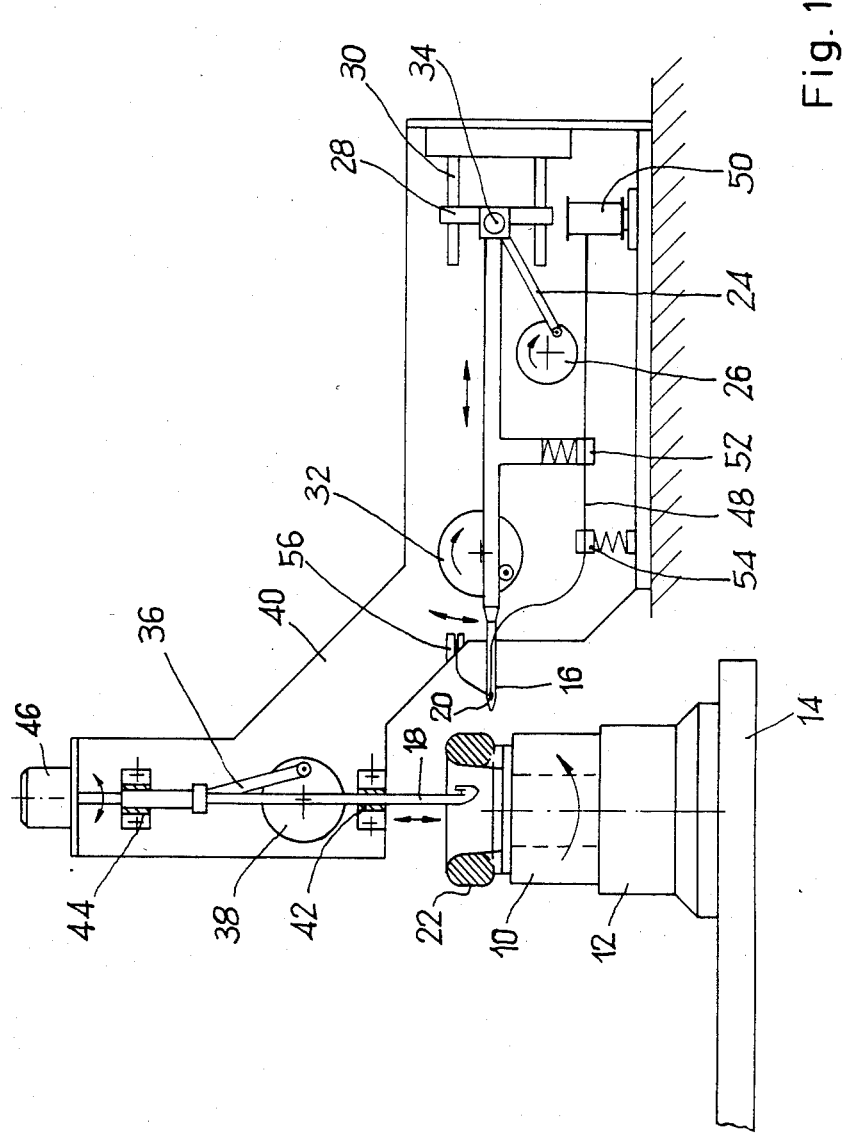
FIG. 1 shows diagrammatically in side view, partly in section, a binding apparatus and a stator to be wrapped.

In FIG. 1, a stator 10 is held by means of a holding apparatus provided with a rotary drive, the holding being during binding on a rotary stepping table 14. At other stations of the table 14 which are not shown, other working operations can be carried out, e.g. forming of winding overhangs or connecting of ends of thread used for binding. Forming of winding overhangs may also be effected simultaneously in known manner with the binding. Stator 10 is held in an upright position during binding, and only the winding overhangs at the upper end of stator 10 are bound. Stator 10 may also be held with its central longitudinal axis otherwise disposed, e.g. in a horizontal position. It is possible to use a further binding tool to bind winding overhangs at both ends of stator 10 at the same time.

The binding apparatus comprises a needle 16 and a hook 18 which together constitute a binding tool. When stator 10 is in the upright position shown, needle 16 is guided and driven so that it moves in reciprocating manner substantially radially with respect to stator 10. At the same time, needle 16 is taken upwardly and downwardly alternately transversely to the said reciprocating movement. Thus, needle 16 in alternate manner at a radial forward and return stroke moves with an eye 20 situated at the needle's front end one time through below winding overhangs 22 into the region of the stator bore, and the next time axially outside the winding overhangs, passing over these into the region of the stator bore again. To produce said radial reciprocating movement of needle 16, its rear end is connected by way of a link 24, pivotably mounted at both sides, to a first eccentric drive 26 which rotates stepwise. It would be possible for needle 16 to be moved upwards and downwards as a whole to obtain said upward and downward movement of needle 16. However, in the present example, the rear end of needle 16 is secured pivotably on a cross-member 28 which is displaceable only radially relatively to stator 10 by means of a rod guide 30. By means of a second eccentric drive 32, the front end of needle 16 is raised and lowered alternately, the needle 16 as a whole pivoting about articulation 34 situated at the needle's rear end. Hook 18 is connected by means of a link 36 mounted pivotably at both sides to a third eccentric drive 38 which moves hook 18 to and fro axially relatively to stator 10. A housing 40 has bearing 42 and 44 of hook 18. By means of a rotary drive 46, hook 18 can be rotated in to and fro manner about an angle of approximately 90° about the longitudinal axis of needle 16.

Thread 48 used for binding winding overhangs 22 is drawn from a spool 50 serving as a thread supply. The thread conducted to needle eye 20 by way of two clamping brakes 52 and 54 whose clamping force is adjustable. Brake 52 moves together with needle 16 forwards and backwards. Brake 54 is arranged nearer needle eye 20 and mounted on housing 40. Brakes 52 and 54 are opened and clamped alternately for example by a cam control arrangement so that (with thread held fast at winding overhangs 22) at each direction of movement of the needle 16, replenishing thread is provided in opposition to the resistance of a said brake. Another thread brake arrangement could be used if desired. The thread start must be held fast so that first loops can be drawn when binding. A clamping device 56 provides that holding, and may be designed so that it also automatically grasps thread at the end of the binding operation.

Figure 2:
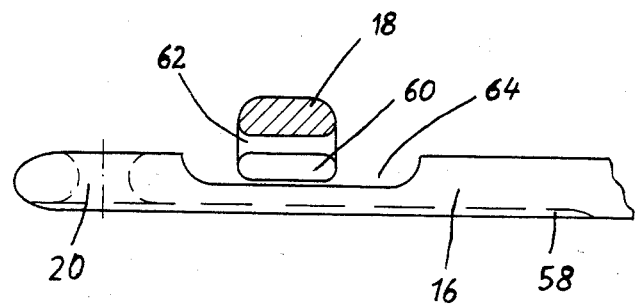
FIG. 2 shows in plan view on a larger scale the front end of the needle of the binding apparatus according to FIG. 1 and the hook of that apparatus.

In FIG. 2, needle 16 is rounded at its front end and has a through needle eye 20, the central axis of which is situated transversely to the central axis of stator 10. Needle 16 has at at least one side a longitudinally disposed channel 58, so that thread can lie in a protected situation when the needle 16 runs under winding overhangs 22. Because hook 18 always operates at the same side of needle 16, a hollow needle could be used, the thread being taken through it in the longitudinal direction. In that alternative, instead of a through needle eye 20 there could be a thread outlet aperture at the front end of the needle and at the side at which hook 18 is situated. Hook 18 has a hook nose 60 constituting a hook mouth 62 to engage a thread loop drawn by needle 16 from radially externally to the radially internal side of winding overhangs 22. To improve this transfer, needle 16 is laterally recessed with a vertically disposed transverse groove 64, so that thread issuing from needle eye 20 reliably enters hook mouth 62, whereas hook nose 60 in moving past needle 16 travels through transverse groove 64.

Figure 3A:
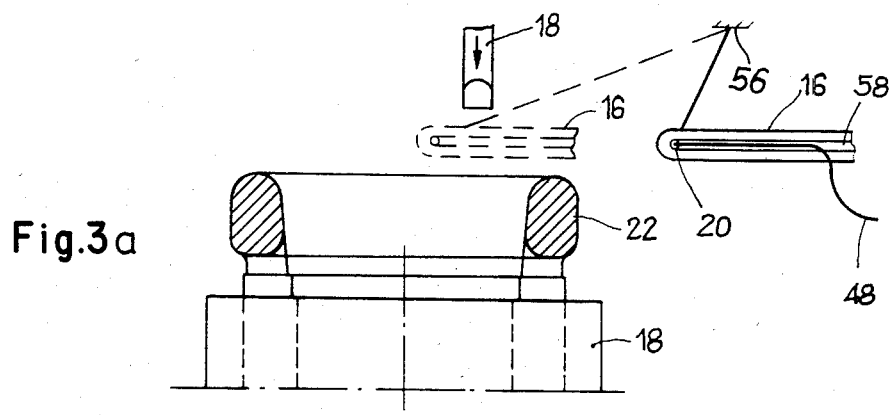
FIGS. 3a to 3i show a sequence of side views of the needle and the hook of the binding apparatus according to FIG. 1 in various intermediate stages in the binding of the winding overhangs of a stator.
Figure 3B:
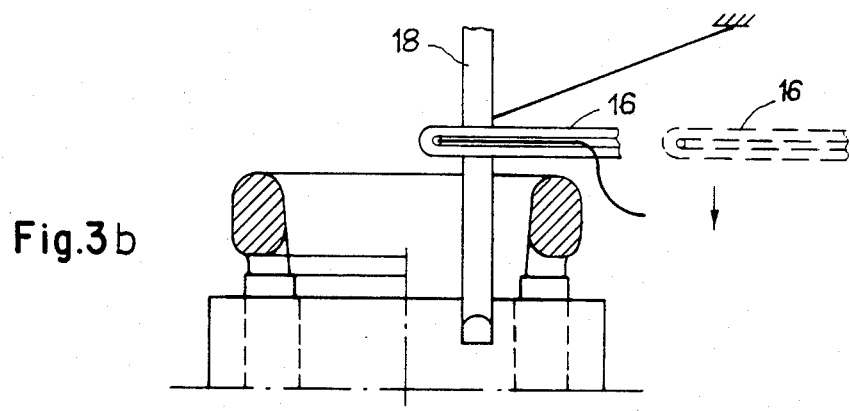
Figure 3C:
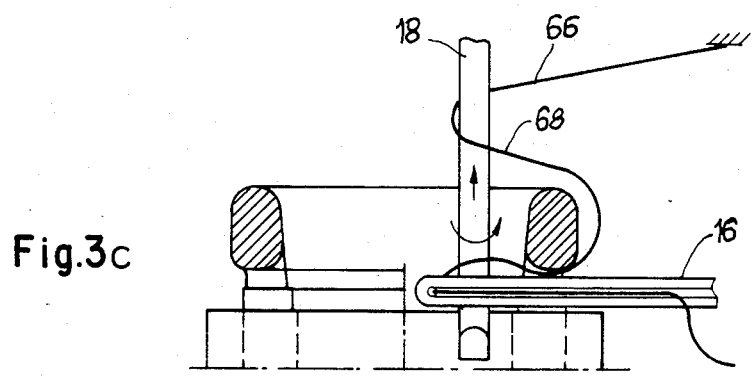

FIGS. 3a to 3i show movements of the binding tool during the binding operation. At the beginning: needle 16 is situated radially externally of winding overhangs 22 to be bound; and hook 18 is situated axially externally of winding overhangs 22 to be bound. The free end of thread 48 is clamped at 56. First, needle 16 travels axially outside winding overhangs 22 into the radially internal position shown in broken lines in FIG. 3a. Next, as shown in FIG. 3b, hook 18 moves through between needle 16 and the thread end clamped fast at 56, so that hook 18 occupies into its lowest position wherein hook nose 60 is directed towards needle 16. When needle 16 returns into the radially external position shown in broken lines in FIG. 3b, the first thread loop (comprising legs 66 and 68) remains caught on the shank of hook 18. At first, hook 18 remains in its lowest position as shown in FIGS. 3b and 3c, whilst needle 16 draws the second thread loop radially inwardly from outside, this time through below winding overhangs 22. When the first loop was formed as shown in FIG. 3a, hook nose 60 was situated above needle 16; whereas in the lower end position of hook 18, hook nose 60 is below needle 16. Thus, despite close proximity shown in FIG. 2, needle 16 can be pushed past hook 18. In all positions, hook 18 remains at that side of needle 16 at which thread 48 issues from needle eye 20 and at which transverse groove 64 is also situated.

Figure 3D:
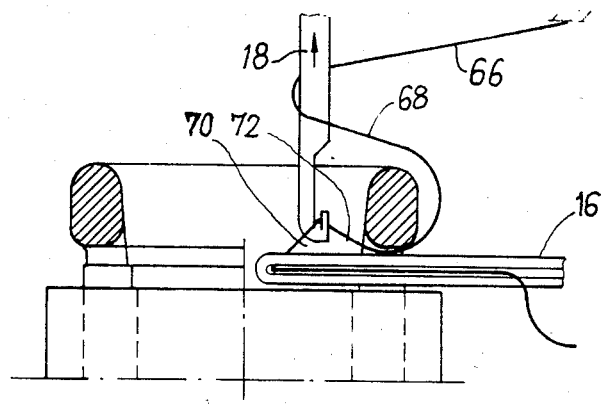
Figure 3E:
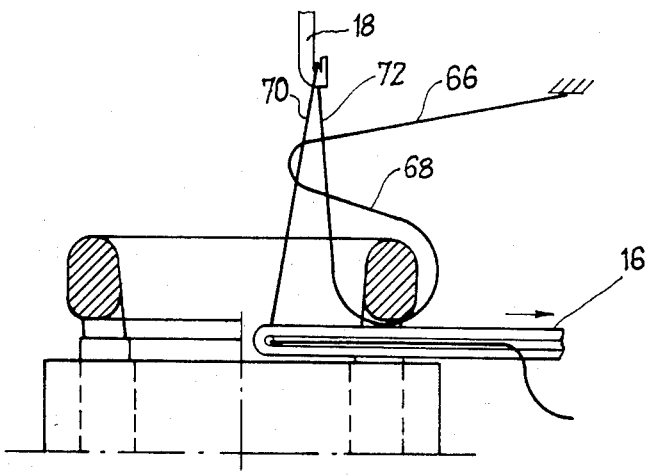
Figure 3F:
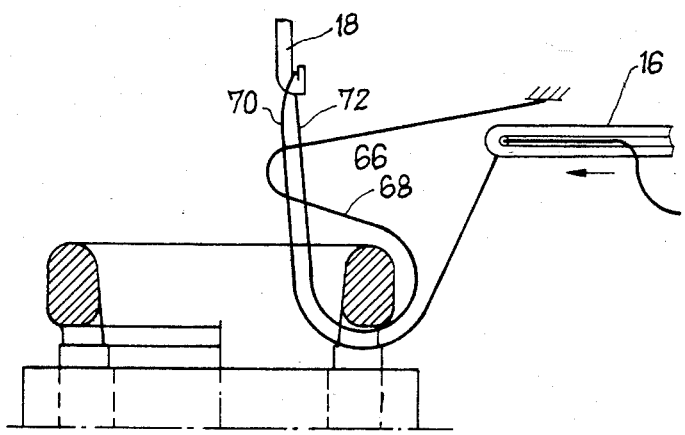
Figure 3G:
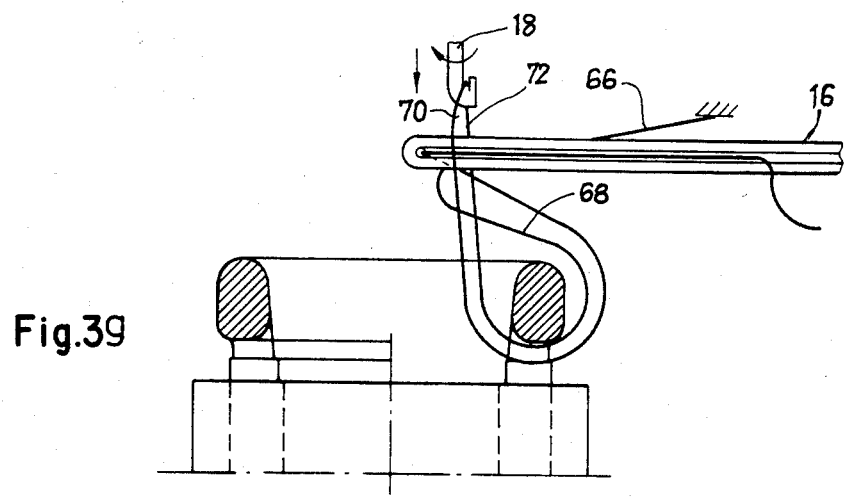
Figure 3H:
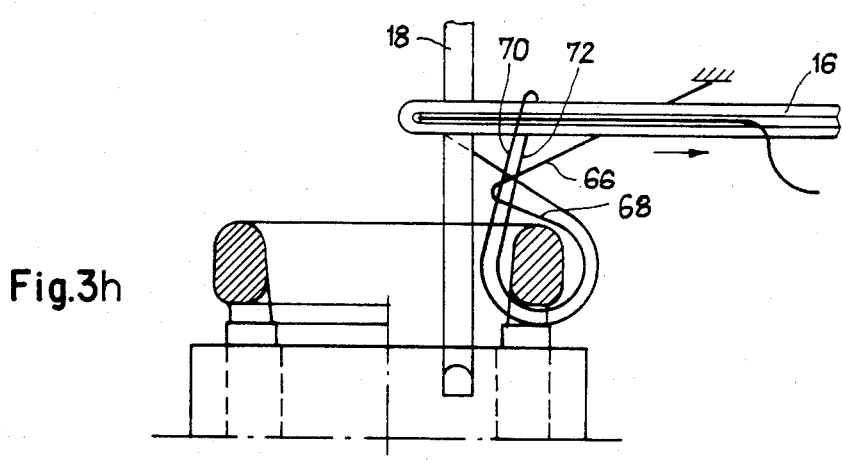
Figure 3I:
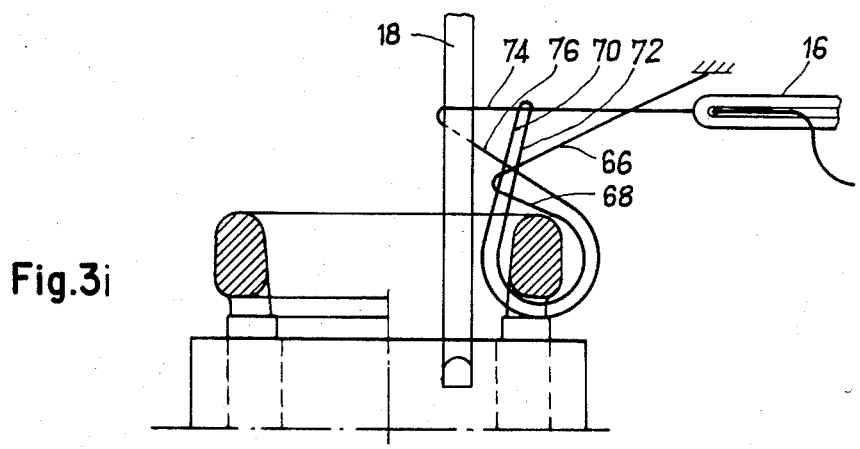

From the position shown in FIG. 3c, hook 18 runs (with hook nose 60 directed towards needle 16) at first upwardly until needle 16 in a position shown in FIG. 2 has caught thread coming from needle eye 20 and holds that thread in hook mouth 62. Then, hook 18 is turned through about 90° into the positions shown in FIG. 3d, wherein hook nose 60 points in the opposite direction to that of needle 16. In this position of the hook nose 60, hook 18 (together with the second thread loop, which is held in hook mouth 62 and which comprises legs 70 and 72) can be drawn upwardly through thread loop 66, 68 as is shown in FIG. 3e. Needle 16 is thereupon drawn back into the radially external position shown in FIG. 3f, and then travels as shown in FIG. 3d axially outside of winding overhangs 22 but below hook 18 into the radially internal position, needle eye 20 passing through the second thread loop 70, 72. In so doing, a third thread loop comprising legs 74, 76 is formed and drawn radially inwardly. After hook 18 has again been turned through about 90°, so that its nose 60 again points towards the needle 16, hook 18 can travel as shown in FIG. 3h radially inside of the second loop 70, 72 through the third loop 74 and 76 into the lower position of hook 18, so that the third loop is again held on the shank of the hook. When needle 16 then withdraws radially outwardly, the position shown in FIG. 3i is reached which corresponds to the position shown in broken lines in FIG. 3b. The operations are then repeated as described in connection with and following the position shown in FIG. 3c.

FIG. 3i shows that each subsequent thread loop is drawn through the preceding loop, so that with the exception of the first and last loops all thread loops have two intertwinings. For example, at one intertwining place, a previously formed loop (e.g. loop 66, 68) is looped about a corresponding loop (e.g. loop 70, 72); and at the other intertwining place, the loop just dealt with (e.g. loop 70, 72) itself is looped about the next loop in succession (e.g. loop 74, 76).

FIG. 3i also shows that when the thread is drawn tight, all the intertwinings (i.e. those places where one loop is looped about the other) are situated at the internal side of winding overhangs 22 considered in the radial direction, in fact in the axially external region. If hook 18 were taken from below through the stator 10 and drew downwardly each of the loops formed axially outside the winding overhangs 22, this drawing being through the loops drawn through under the winding overhangs, the intertwinings of the loops would also lie at the radially internal side of the winding overhangs, but nearer to the stator laminations.

Figure 4:
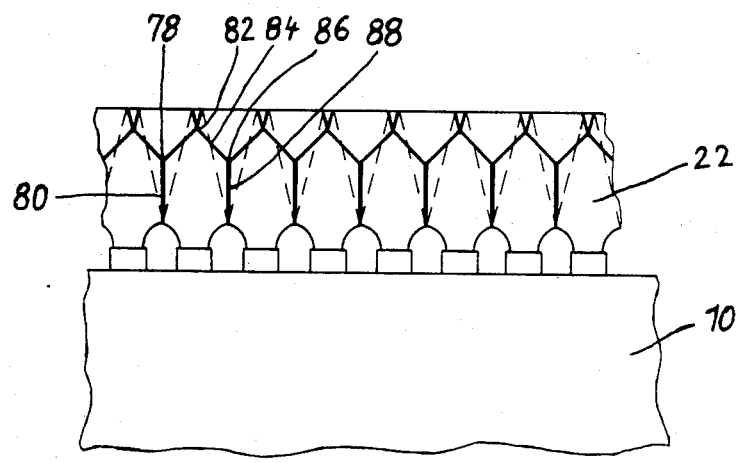
FIG. 4 shows a view from radially internally onto winding overhangs bound as shown in FIG. 3, and illustrated as a straight development of the circumference.

FIG. 3i also shows that the loops arranged in succession to one another are drawn about winding overhangs 22 in the clockwise and counterclockwise directions alternately. If stator 10 is turned onwards during the binding operation by the rotary drive of holder 12, so that needle 16 (progressing round the circumference of the stator) passes each time between the next two stator slots under the winding overhangs, the thread pattern shown in FIG. 4 is obtained in development of the circumference, as viewed from the radially internal side. If the binding operation progresses from left to right, a first arbitrarily selected thread loop, which is taken axially outside about winding overhangs 22, extends to point 78 where that loop is wound round the next thread loop 80 (FIG. 4) in succession taken through below the winding overhangs. Loop 80 comprises (as described in connection with FIGS. 3a to 3b) two thread legs. Loop 80 is inflected at 78, by being wound with the previously formed loop and ends at point 82. There, loop 80 is wound about the next loop 84, which is taken at the top over winding overhangs 22. Loop 84 ends at a point 86 where loop 84 is looped about the next loop 88, which is taken through below winding overhangs 22. Because each loop engages the next formed loop before the end of the latter and deflects it with a bend, there is obtained the zigzag pattern shown in FIG. 4, which is known as a "diamond stitch" or in embroidery as a "tambour stitch".

The broken-line thread pattern in FIG. 4 shows at the radially external region of winding overhangs 22 that contrary to what happens at the radially internal side of winding overhangs 22, the two legs of each loop diverge from one another, and there are no intertwinings of the loops. Thus the binding provides a secure hold (more particularly at the endangered radially internal side) for the winding overhangs.

I claim:

1. In a method of producing a hollow stator or rotor for electrical machines, said stator or rotor comprising winding ends having peripherally spaced openings adjacent said winding ends and wire thread wound thru said openings and around said winding ends, the steps of:

(a) mounting said stator or rotor so that it is rotatable about its longitudinal axis;
(b) providing a supply of wire thread;
(c) forming loops of said wire thread in succession to one another and in progression about the periphery of said stator or rotor;
(d) drawing loops through respective loops formed previously from said wire thread;
(e) drawing all of said loops radially inwardly from the outside of said rotor or stator into the hollow interior thereof; and
(f) performing step (d) on the internal side of said winding ends.

2. A method according to claim 1, wherein loops taken through the openings below the winding ends are drawn axially outwardly for intertwining with loops taken over the winding ends.

3. A method according to claim 1, wherein loops taken over the winding ends are drawn axially inwardly for intertwining with loops drawn through the openings below winding ends.

4. A method according to any one of claims 1 to 3, wherein all loops are formed directly by a thread movement pattern itself, and each second loop is engaged by a gripper and drawn through the respective loop formed just previously.

5. A method according to any one of claims 1 to 3, wherein the winding ends are bound simultaneously and synchronously in progression at both ends of the stator or rotor.

6. A method according to any one of claims 1 to 3, wherein the thread end is laid in the same direction on or directly adjacent the wire thread start, and then the wire thread end and thread start are welded to one another.

* * * * *